United States Patent
Rossi

(10) Patent No.: US 9,143,624 B2
(45) Date of Patent: Sep. 22, 2015

(54) AUDITING OF DATA PROCESSING APPLICATIONS

(71) Applicant: Ab Initio Technology LLC, Lexington, MA (US)

(72) Inventor: Larry Paul Rossi, Colorado Springs, CO (US)

(73) Assignee: Ab Initio Technology LLC, Lexington, MA (US)

( * ) Notice: Subject to any disclaimer, the term of this patent is extended or adjusted under 35 U.S.C. 154(b) by 143 days.

(21) Appl. No.: 13/837,860

(22) Filed: Mar. 15, 2013

(65) Prior Publication Data
US 2014/0273930 A1 Sep. 18, 2014

(51) Int. Cl.
*G06F 17/30* (2006.01)
*H04M 15/00* (2006.01)

(52) U.S. Cl.
CPC ......... *H04M 15/41* (2013.01); *G06F 17/30289* (2013.01); *H04M 15/43* (2013.01); *H04M 15/725* (2013.01); *H04M 15/73* (2013.01)

(58) Field of Classification Search
None
See application file for complete search history.

(56) References Cited

U.S. PATENT DOCUMENTS 8,051,165 B2 11/2011 Enqvist et al.
2011/0010461 A1 1/2011 Lassila et al.

FOREIGN PATENT DOCUMENTS

EP 1 428 125 11/2010

OTHER PUBLICATIONS

International Search Report and Written Opinion issued in related application No. PCT/US14/15762, on Jul. 8, 2014.

*Primary Examiner* — Wilson Lee
(74) *Attorney, Agent, or Firm* — Fish & Richardson P.C.

(57) ABSTRACT

A method includes determining a first quantity of data records of a group of data records from a stream of data records received by an application having a plurality of modules. The method includes, for one or more of the modules of the application, determining a respective second quantity of data records output by the module during processing of the group of data records. The method includes determining whether the first and second quantities of data records satisfy a rule. The rule is indicative of a target relationship among a quantity of data records received by the application and a quantity of data records output by one or more modules of the application.

34 Claims, 11 Drawing Sheets

| | Reconcile Rule | Process Step | Action | ▲ Action Target |
|---|---|---|---|---|
| 1 | GGSN Parse Reconcile | GGSN Parse Subscribe 302 | Add | Normal |
| 2 | GGSN Parse Reconcile | GGSN Parse Subscribe Filter Deselect 304 | Subtract | Normal |
| 3 | GGSN Parse Reconcile | GGSN Parse Publish | Subtract | Normal |
| 4 | GGSN Parse Reconcile | GGSN Parse Subscribe Format Reject | Transfer | Error |
| 5 | GGSN Parse Reconcile | GGSN Parse Publish Reject | Transfer | Error |
| 6 | GGSN Parse Reconcile | GGSN Parse Custom Reject | Transfer | Error |
| 7 | GGSN Parse Reconcile | GGSN Parse Translate Reject 306 | Transfer | Error |

FIG. 3

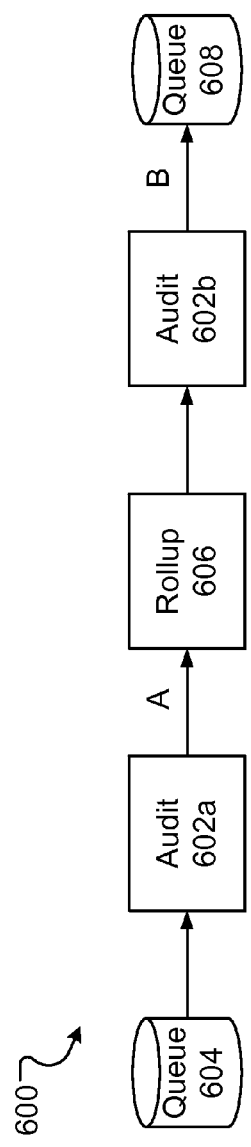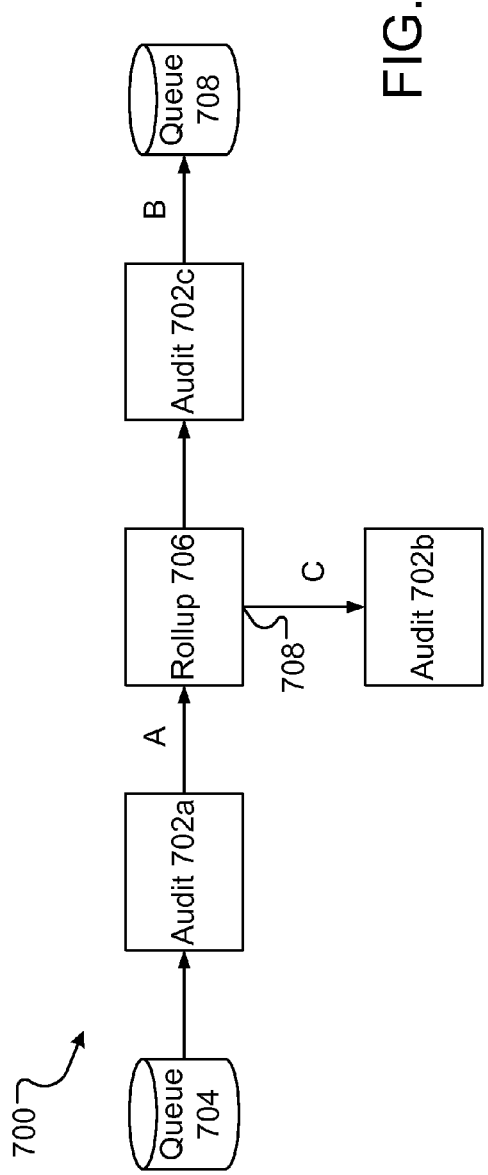

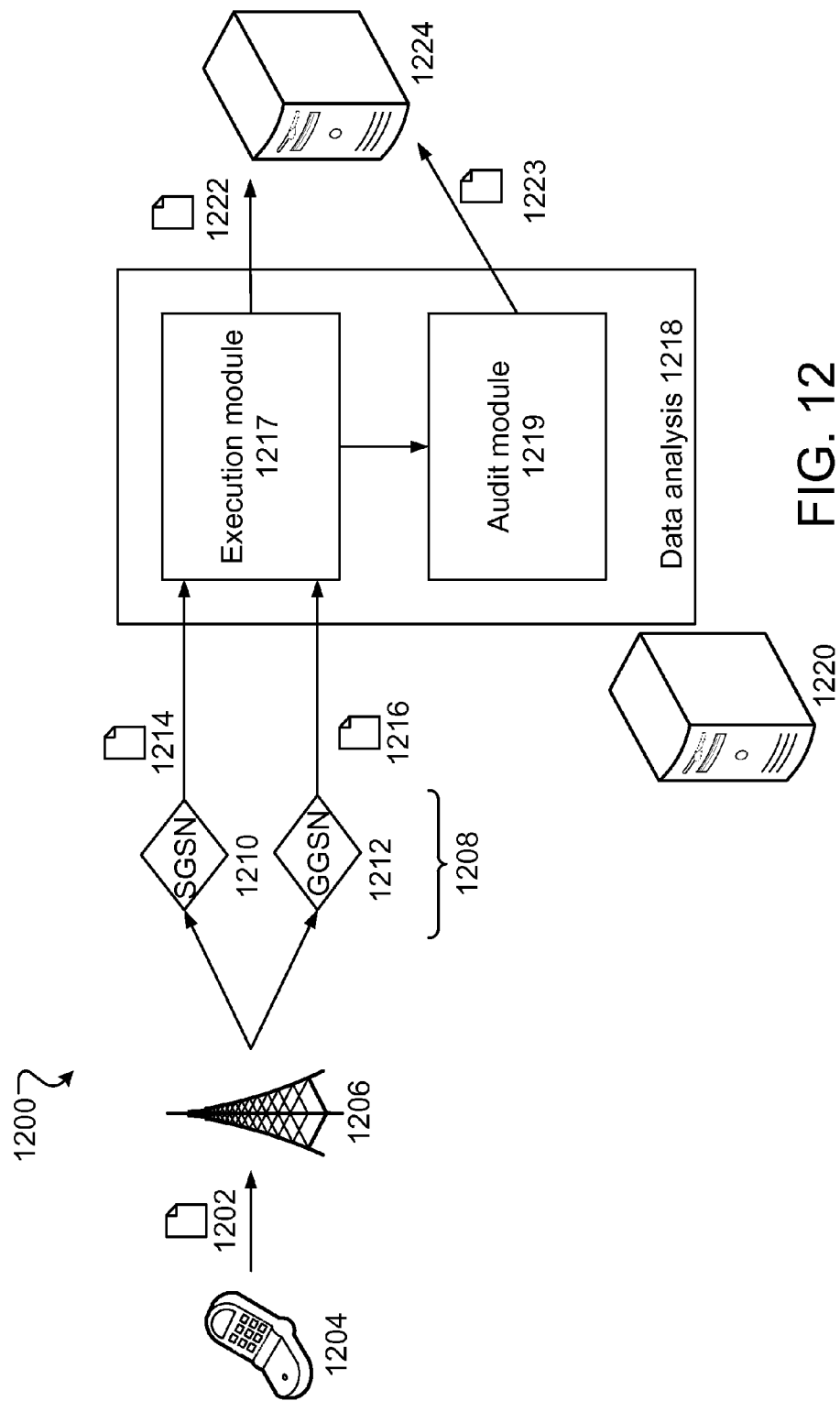

AUDITING OF DATA PROCESSING APPLICATIONS

BACKGROUND

This description relates to auditing of data processing applications.

In mobile telephone communication systems, data representing communications (e.g., telephone calls) is processed by data processing applications to convert the communications data into billing data.

SUMMARY

In a general aspect, a method includes determining a first quantity of data records of a group of data records from a stream of data records received by an application having a plurality of modules. The method includes, for one or more of the modules of the application, determining a respective second quantity of data records output by the module during processing of the group of data records. The method includes determining whether the first and second quantities of data records satisfy a rule. The rule is indicative of a target relationship among a quantity of data records received by the application and a quantity of data records output by one or more modules of the application.

Embodiments may include one or more of the following.

The method includes providing a report indicative of whether the rule is satisfied.

The application includes a particular component that includes a plurality of output ports, and wherein the target relationship includes an indication that a quantity of records received by the particular module equals a quantity of records output through each output port of the particular module.

The application includes a particular module that outputs an output quantity of records for each received input quantity of records, the input quantity different from the output quantity, and wherein the target relationship includes an indication a ratio between the input quantity and the output quantity.

The method includes specifying the rule.

The method includes receiving a specification of the rule.

Determining a second quantity of data records output from a particular module of the application includes counting the data records output from the particular module.

Determining a second quantity of data records output from a particular module of the application includes counting the data records output from a first output port of the particular module; and calculating a number of data records output from a second output port of the particular module based on the number of data records output from the first output port and a number of data records input into the particular module.

The method includes determining a latency of the application based on a start time at which the application receives the data records in the group of data records and an end time at which the application finishes processing the data records in the group of data records. In some cases, the application has finished processing the data records when the first quantity and the second quantities satisfy the rule.

The method includes recording a time at which a particular one of the data records of the group of data records is processed by a particular one of the modules of the application.

The method includes determining a latency of the particular module based on the recorded time.

The method includes receiving the data records from a mobile telephone system.

The data records include first data records processed by a first type of switch in a mobile telephone system and second data records processed by a second type of switch in the mobile telephone system.

In a general aspect, software is stored on a computer-readable medium. The software includes instructions for causing a computing system to determine a first quantity of data records of a group of data records from a stream of data records received by an application having a plurality of modules. The instructions cause the computing system to determine, for one or more of the modules of the application, a respective second quantity of data records output by the module during processing of the group of data records. The instructions cause the computing system to determine whether the first and second quantities of data records satisfy a rule, the rule indicative of a target relationship among a quantity of data records received by the application and a quantity of data records output by one or more modules of the application.

In a general aspect, a computing system includes at least one processor configured to determine a first quantity of data records of a group of data records from a stream of data records received by an application having a plurality of modules. The processor is configured to determine, for one or more of the modules of the application, a respective second quantity of data records output by the module during processing of the group of data records. The processor is configured to determine whether the first and second quantities of data records satisfy a rule, the rule indicative of a target relationship among a quantity of data records received by the application and a quantity of data records output by one or more modules of the application.

In a general aspect, a computing system includes means for determining a first quantity of data records of a group of data records from a stream of data records received by an application having a plurality of modules; means for determining, for one or more of the modules of the application, a respective second quantity of data records output by the module during processing of the group of data records; and means for determining whether the first and second quantities of data records satisfy a rule, the rule indicative of a target relationship among a quantity of data records received by the application and a quantity of data records output by one or more modules of the application.

Aspects can include one or more of the following advantages.

In a mobile telephone system, data records corresponding to telephone calls or other communications are used to generate billing records. The techniques described herein can help to reduce the quantity of data records streamed into a data processing system that are lost or rejected by the data processing system. For instance, for an application that converts the data records into billing records, minimizing data record loss can help ensure that the billing records can more accurately reflect actual activity, resulting in increased revenue for mobile telephone companies. In addition, the techniques described herein can provide information about data volume over a period of time, thus enabling mobile telephone companies to better plan upgrades to communications capacity infrastructure. Furthermore, the techniques described herein can provide information about latency of the application, helping application developers to improve the performance of the application.

Other features and advantages will become apparent from the following description, and from the claims.

DESCRIPTION OF DRAWINGS

FIG. 3 is a diagram of example reconciliation operations.

FIGS. 4-7 are block diagrams of example data processing applications.

FIG. 12 is a block diagram of a system for auditing of mobile phone records.

DESCRIPTION

A data processing application, such as an application that converts mobile telephone communication records into billing records, receives streams of data records for processing. Some of the data records may be lost, rejected by a module of the data processing application, or otherwise not processed by the data processing application. Monitoring the quantity of data records that are received by and output by a data processing application can help identify the scale of these losses. This monitoring data can be used to determine whether the data processing application is operating correctly, helping to ensure that appropriate revenues can be collected from the mobile telephone communications. In addition, monitoring the quantity of data records processed by the data processing application over time can help inform decisions about changes in or upgrades to telephone system capacity infrastructure.

Figure 1:
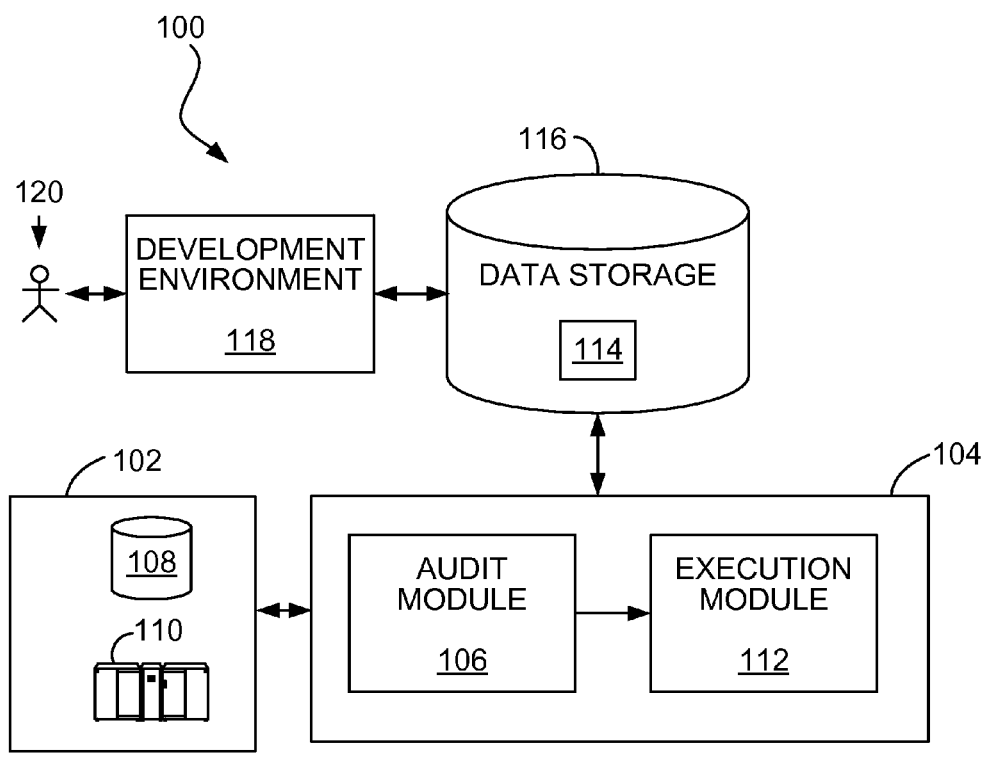
FIG. 1 is a block diagram of a system for auditing of data processing applications.

FIG. 1 shows an exemplary data processing system 100 in which techniques for auditing of data processing applications can be used. The system 100 includes a data source 102 that may include one or more sources of data such as storage devices or connections to online data streams, each of which may store or provide data in any of a variety of formats (e.g., database tables, spreadsheet files, flat text files, or a native format used by a mainframe). An execution environment 104 includes an audit module 106 and an execution module 112. The execution environment 104 may be hosted, for example, on one or more general-purpose computers under the control of a suitable operating system, such as a version of the UNIX operating system. For example, the execution environment 104 can include a multiple-node parallel computing environment including a configuration of computer systems using multiple central processing units (CPUs) or processor cores, either local (e.g., multiprocessor systems such as symmetric multi-processing (SMP) computers), or locally distributed (e.g., multiple processors coupled as clusters or massively parallel processing (MPP) systems, or remote, or remotely distributed (e.g., multiple processors coupled via a local area network (LAN) and/or wide-area network (WAN)), or any combination thereof.

The execution module 112 reads data from the data source 102. Storage devices providing the data source 102 may be local to the execution environment 104, for example, being stored on a storage medium connected to a computer hosting the execution environment 104 (e.g., hard drive 108), or may be remote to the execution environment 104, for example, being hosted on a remote system (e.g., mainframe 110) in communication with a computer hosting the execution environment 104, over a remote connection (e.g., provided by a cloud computing infrastructure).

The execution module 112 executes one or more data processing applications to process the data read from the data source 102. The data processing applications include one or more modules, each of which executes a process on the data records received by the module. Output data 114 generated by the data processing applications may be stored back in the data source 102 or in a data storage system 116 accessible to the execution environment 104, or otherwise used.

The audit module 106 monitors the processing of data records by the modules of the data processing applications executed by the execution module 112. The audit module 106 also analyzes the results of the monitoring to determine information indicative of the performance of the data processing application. For instance, the audit module 106 may determine a quantity of data records that are rejected by one or more modules of a data processing application. The auditing module 106 may determine a volume of data records processed by a data processing application over a given period of time. The audit module 106 may determine latency associated with processing data records by a data processing application. Other indications of the performance of a data processing application may also be determined by the audit module 106. Based on the performance information determined by the audit module 106, errors in processing can be identified (e.g., errors due to corrupted data records, errors due to modules of the data processing application that do not function as intended, etc.), trends in data processing volume over time can be examined, or other analysis can be conducted.

The data storage system 116 is also accessible to a development environment 118 in which a developer 120 is able to configure and monitor the execution module 112. The development environment 118 is, in some implementations, a system for developing applications as dataflow graphs that include vertices (representing data processing components or datasets) connected by directed links (representing flows of work elements, i.e., data) between the vertices. For example, such an environment is described in more detail in U.S. Publication No. 2007/0011668, titled "Managing Parameters for Graph-Based Applications," incorporated herein by reference. A system for executing such graph-based computations is described in U.S. Pat. No. 5,966,072, titled "EXECUTING COMPUTATIONS EXPRESSED AS GRAPHS," incorporated herein by reference. Dataflow graphs made in accordance with this system provide methods for getting information into and out of individual processes represented by graph components, for moving information between the processes, and for defining a running order for the processes. This system includes algorithms that choose interprocess communication methods from any available methods (for example, communication paths according to the links of the graph can use TCP/IP or UNIX domain sockets, or use shared memory to pass data between the processes).

The execution module 112 can receive data from a variety of types of systems that may embody the data source 102, including different forms of database systems. The data may be organized as records having values for respective fields (also called "attributes" or "columns"), including possibly null values. When first reading data from a data source, the execution module typically starts with some initial format information about records in that data source. In some circumstances, the record structure of the data source may not be known initially and may instead be determined after analysis of the data source or the data. The initial information about records can include, for example, the number of bits that represent a distinct value, the order of fields within a record, and the type of value (e.g., string, signed/unsigned integer) represented by the bits.

Figure 2:
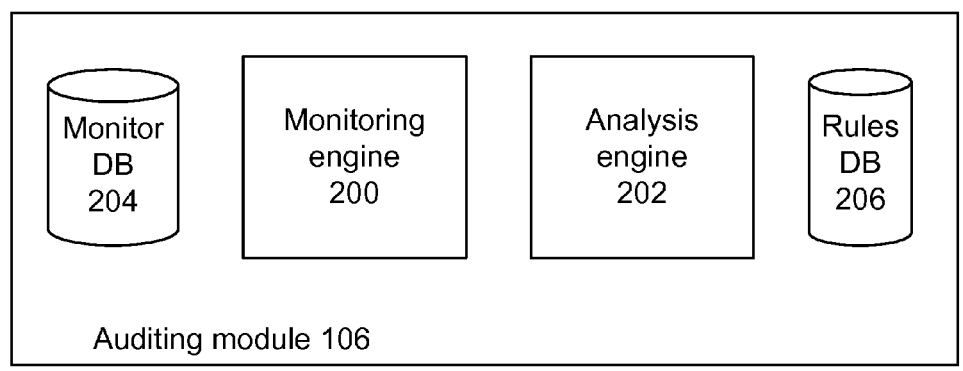
FIG. 2 is a block diagram of an example audit module.

Referring to FIG. 2, the audit module 106 includes a monitoring engine 200 that monitors the quantity of data records processed by a data processing application, temporal information (e.g., clock times) associated with processing a set of data records, or both. An analysis engine 202 analyzes the results of the monitoring to generate information indicative of the performance of the data processing application, such as an indication of whether the data processing application is operating normally or with errors, an indication of a latency of the data processing application, or another indication of the performance of the data processing application.

The monitoring engine 200 may determine the quantity of data records received by the data processing application. For instance, the monitoring engine 200 may identify a group of data records, referred to herein as a "record set," for which processing by a data processing application is to be monitored. The quantity of data records initially received by the data processing application may be the quantity of data records in the record set. The quantity of data records transferred out of a module, rejected by a module, or otherwise processed by a module of a data processing application may be monitored for each record set.

In some examples, data records may be received by a data processing application from one or more files. The data records in each file may be identified as a record set. In some examples, data records may be received by a processing application as a stream of data records. For instance, a data processing application may subscribe to a queue that provides a substantially continuous stream of data records to the data processing application. The monitoring engine 200 may identify subsets of the stream of data records as record sets, e.g., based on a definition of a record set. In some cases, a record set may be defined to include a fixed number of data records (e.g., each successive group of 1000 data records in the stream may be identified as a record set). In some cases, a record set may be defined to include the data records streamed to the data processing application over a fixed period of time (e.g., the data records streamed during each successive ten minute time period may be identified as a record set). The quantity of data records in a record set may be fixed or may vary with each record set, e.g., depending on the streaming rate or on other factors that affect the number of data records streamed per unit time. Other definitions for a record set are also possible. The definition of a record set may be fixed or may be specified, e.g., by a user or developer of the data processing application.

The monitoring engine 200 may determine the quantity of data records from a record set that are transferred out of the data processing application. A module may transfer data records out of a data processing application as part of the normal operation of the module. For instance, a filter module may transfer out (i.e., output) data records that do not satisfy a filter criterion. In this example, the monitoring engine may determine the quantity of data records in the record set being monitored that are transferred out of the filter module. The last module in a data processing application may transfer (i.e., output) data records out of the data processing application, e.g., by publishing the data records to a queue, by writing the data records to a file, etc. In this example, the monitoring engine may determine the quantity of data records in the record set that are transferred out of the last module of the data processing application.

The monitoring engine 200 may determine the quantity of data records from a record set that are rejected by a module of the data processing application in error. For instance, a module may reject data records due to an error in the rejected data record (e.g., a format error, a corrupted data record, or another data record error), an error in the processing of the data record (e.g., a malfunction during processing of the data record by the module or another processing error), or another type of error.

The monitoring engine 200 may monitor changes in the quantity of data records that occur during processing of the data records. For instance, a rollup module or a join module may combine multiple input records into a single output record. A divide module may split each input record into multiple output records. In some examples, a ratio between the quantity of input records and the quantity of output records is fixed (e.g., a 4:1 rollup module that combines every four input records into a single output record). In some examples, the ratio is variable (e.g., a join module that combines any input records within a particular time range that share a common join key into a single output record).

In some examples, the monitoring engine 200 may receive data from one or more audit modules of a data processing application that determine the quantity of records at a particular point in the data processing application. For instance, an audit module may be placed at each input to the data processing application, at each transfer output from the data processing application, at each reject output from the data processing application, and at each module that changes the quantity of data records. The audit modules may determine a quantity of data records at each point. In some examples, the audit modules are separate modules of the data processing application. In some examples, the audit capability is included in the logic of the processing modules themselves.

In some examples, the monitoring engine 200 monitors temporal information (e.g., a clock time) associated with processing the data records of a record set. For instance, the monitoring engine 200 may monitor the time at which a particular data record of a record set (e.g., the first data record, the last data record, or one or more other particular data records) is received by a particular module of the data processing application, transferred out by a particular module of the data processing application, rejected by a particular module of the data processing application, or otherwise processed by a particular module of the data processing application. In some examples, the monitoring engine 200 monitors the earliest clock time associated with processing any data record of a record set and the latest clock time associated with processing any data record of the record set.

In some examples, the results of the monitoring (e.g., quantities of data records at various points of the data processing application, times associated with data record processing, etc.) are stored in a data structure, such as a monitoring database 204.

The analysis engine 202 analyzes the results of the monitoring of the processing of a record set (e.g., by accessing the results stored in the monitoring database 204) to generate information indicative of the performance of the data processing application, such as an indication of whether the data processing application is operating normally or with errors, an indication of a latency of the data processing application, or another indication of the performance of the data processing application.

In some examples, the analysis engine applies a reconciliation rule to the quantities of data records determined by the monitoring engine 200. A reconciliation rule is an expression (e.g., an arithmetic expression) that reflects a target relationship among the quantity of data records received by a data processing application, the quantity of data records transferred out of the data processing application, the quantity of data records rejected by the data processing application, etc. A reconciliation rule that is not satisfied by the processing of a particular record set may indicate that an error occurred during processing of the record set. A reconciliation rule that is satisfied by the processing of a particular record set may indicate that the data processing application operated correctly during processing of the record set. In some examples, results of applying a reconciliation rule for the processing of a record set (e.g., whether the reconciliation rule was satisfied) may be stored in the monitoring database 204.

One example reconciliation rule may specify that the quantity of data records received by a data processing application should equal the quantity of data records transferred out of the data processing application plus the quantity of data records rejected by the data processing application:

Records In−Records Transferred Out−Records Rejected=0.

If this reconciliation rule is not satisfied by the processing of a particular record set, this may indicate errors such as a malfunctioning module (e.g., a module that receives, transfers out, and/or rejects records when it should not be doing so), an incorrect configuration of a module, or another performance issue.

Another example reconciliation rule may specify that the quantity of data records received by a data processing application should equal the quantity of data records transferred out of the data processing application:

Records In−Records Transferred Out=0.

This reconciliation rule may not be satisfied if a data record is rejected in error from any module of the data processing application. The processing of a record set that does not satisfy this reconciliation rule may indicate a problem with one or more data records (e.g., a format problem or a corrupted data record), an incorrect configuration of or a malfunction in a module of the data processing application, or another performance issue.

Other reconciliation rules are also possible. For instance, a reconciliation rule for a data processing application that includes a 4:1 rollup module may specify, in part, that the quantity of data records before the rollup module is four times the quantity of data records after the rollup module.

A reconciliation rule for a data processing application may be specified, e.g., by a developer or user of the data processing application. A reconciliation rule may be developed automatically by the analysis engine 202, e.g., based on an analysis of the flow of data records through the data processing application. Reconciliation rules associated with particular data processing applications may be stored in a data structure, such as a rules database 206.

In some examples, a reconciliation rule may be developed by combining reconciliation operations for each individual module of a data processing application. Reconciliation operations may also be stored in the rules database 206. Referring to FIG. 3, a set of example reconciliation operations 300 are shown that each correspond to an individual module that can be included in a data processing application. For instance, a subscribe operation 302 corresponds to a subscribe module that reads a stream of data records into a data processing application from a queue. The subscribe operation includes instructions to add the quantity of data records read by the subscribe module in the reconciliation rule. A filter operation 304 corresponding to a filter module includes instructions to subtract the quantity of data records transferred out of the data processing application through a deselect port of the filter module. The filter operation 304 further includes instructions that the transfer out of data records is a normal (i.e., non-error) operation. A translate operation 306 corresponding to a translate module includes instructions to subtract the quantity of data records rejected by the translate module and to denote the subtraction as an error operation.

In some examples, the analysis engine 202 may analyze the times associated with processing the data records of a record set to determine one or more latencies such as the latency of the data processing application as a whole (referred to as "end-to-end latency"), the latency of one or more modules of the data processing application, etc. For instance, the end-to-end latency for the processing of a record set by a data processing application may be defined as the time difference between the earliest time associated with any data record of the record set and the time when the reconciliation rule for the data processing application is satisfied for the processing of the record set (i.e., the latest time associated with any data record of the record set). The latency of a particular module of a data processing may also be determined, e.g., by determining the time different between the earliest time associated with processing any data record of the record set by the particular module and the latest time associated with processing any data record of the record set by the particular module. In some examples, data indicative of the latency for the processing of a record set may be stored in the monitoring database 204.

Figure 4:
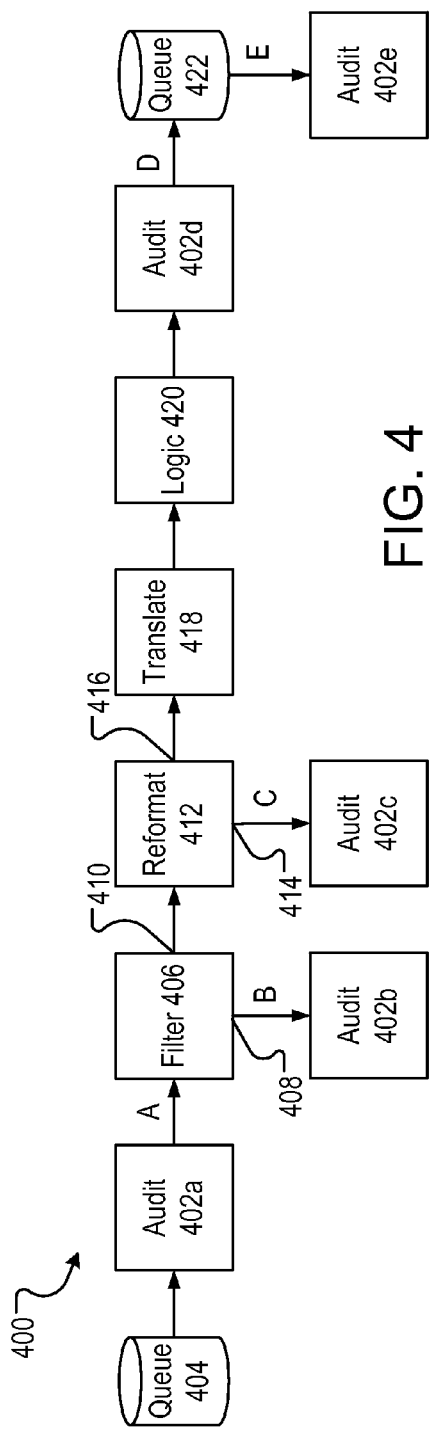

Referring to FIG. 4, the performance of an example data processing application 400 can be audited by audit modules 402a, 402b, 402c, 402d, 402e (referred to collectively as "402"). Each audit module 402 counts a quantity of records passing through the audit module and provides a message indicating the quantity to the auditing module 106. Each audit module 402 also records the time(s) at which one or more particular records pass through the audit module (e.g., the first record of each record set, the last record of each record set, every $100^{th}$ record, every record, etc.).

In the example data processing application 400, a stream of data records is received from a queue 404. The received stream of data records passes through audit module 402a, which counts the quantity (A) of records in each record set. The definition of a record set may be incorporated into the logic of the audit module 402a or may be communicated to the audit module 402a by the audit module 106.

The record set is processed by a filter module 406, which transfers out data records that do not satisfy the criteria of the filter through a deselect port 408. The transferred out data records pass through audit module 402b, which counts the quantity (B) of transferred out data records in each record set. The data records that satisfy the criteria of the filter are output from the filter module 406 through an output port 410 and processed by a reformat module 412. Any data records that do not satisfy the format criteria specified by the reformat module 412 are rejected in error through a reject port 414. The rejected data records pass through audit module 402c, which counts the quantity (C) of transferred out data records in each record set. The remaining data records are output from the reformat module 412 through an output port 416.

The data records are then processed by a translate module 418. The translate module does not transfer out or reject data records. No audit is performed for the translate module, because the quantity of data records into the translate module matches the quantity of data records out of the translate module. A logic module 420 then processes the data records. The logic module 420 transfers data records out for publication to a queue 422. Prior to publication to the queue 422, audit module 402d counts the quantity (D) of transferred out data records in each record set. Audit module 402e counts the quantity (E) of any data records that are rejected in error from the queue 422.

An example reconciliation rule for the data processing application 400 can be expressed as follows:

$$A-B-C\times D\times E=0.$$

That is, the quantity of data records in a record set received by a data processing application (A) minus the quantity of data records rejected (C, E) minus the quantity of data records transferred out of the data processing application (B, D) should be zero for the reconciliation rule to be satisfied (i.e., balanced). A record set whose processing satisfies the reconciliation rule indicates that the data processing application may be performing correctly. A record set whose processing does not satisfy the reconciliation rule indicates that there may be a problem in the execution of the data processing application. For instance, failure of the reconciliation rule to balance may indicate that a module (e.g., the translate module 418) is unexpectedly rejecting data records. Failure of the reconciliation rule to balance may also indicate that a module is unexpectedly changing the quantity of data records, e.g., by a rollup or join operation. Other performance issues may also be indicated by failure of the reconciliation rule to balance.

Another example reconciliation rule for the data processing application 400 can be expressed as follows:

$$A-B-D=0.$$

That is, the quantity of data records in a record set received by a data processing application (A) minus the quantity of data records transferred out under normal operation (B, D) should be zero for the reconciliation rule to be satisfied. A record set whose processing satisfies the reconciliation rule indicates that no data records are being rejected in error from any module of the data processing application (e.g., C and E are zero). A record set whose processing does not satisfy the reconciliation rule may indicate that there are data records being rejected in error from one or more modules of the data processing application (e.g., C and/or E are nonzero). Other performance issues may also be indicated by failure of the reconciliation rule to balance.

Figure 5:
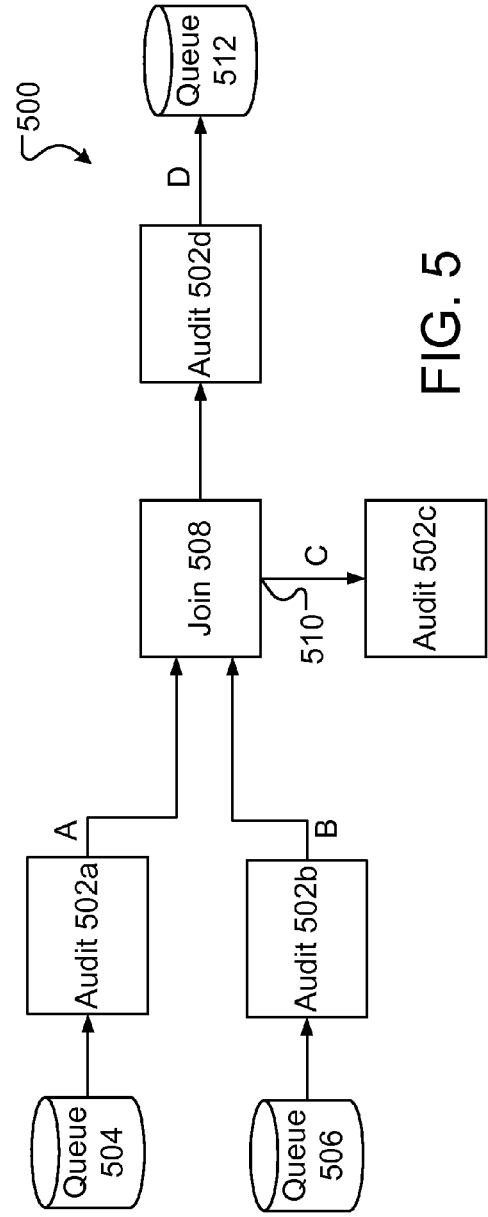

Referring to FIG. 5, the performance of an example data processing application 500 including a join module 508 can be audited. In the example data processing application 500, a first record set of data records is received from a first queue 504 and the quantity of data records (A) in a first record set is counted by an audit module 502a. A second record set of data records is received from a second queue 506 and the quantity of data records (B) in a second record set is counted by an audit module 502b.

The join module 508 combines the data records from the first record set and the data records from the second record set into a single set of data records. For instance, the join module 508 may correlate related data records from the two record sets. Any data records that are rejected during correlation are rejected in error through a reject port 510. The quantity of rejected data records (C) is counted by an audit module 502c. The single set of correlated data records is transferred out of the data processing application 500 to be published to an output queue 512. An audit module 502d counts the quantity of data records (D) transferred out by the join module.

An example reconciliation rule for the data processing application 500 can be expressed as follows:

$$A+B-C-D=0.$$

Referring to FIG. 6, the performance of an example data processing application 600 including a rollup module 606 can be audited. In the example data processing application 600, a stream of data records is received from a queue 604 by the data processing application 600. The quantity of data records (A) in a record set is counted by an audit module 602a. The data records are rolled up by a 4:1 rollup module 606 that combines each successive set of four data records into a single data record. A rollup module is associated with metadata that specifies a mapping relationship (e.g., a ratio, a difference, or another relationship) between a quantity of data records received (B') and a quantity of data records output (B") by the rollup module. Thus, for the 4:1 rollup module 606, B'=4 and B"=1.

The rollup module 606 transfers the rolled up data records out of the data processing application 600 to be published to an output queue 608. An audit module 602b counts the quantity of data records (B) transferred out by the rollup module 606.

An example reconciliation rule for the data processing application 600 can be expressed as follows:

$$A-B=0,$$

where B=-B'+B".

A similar approach to building a reconciliation rule can be taken for a data processing application including a module that divides each data record into multiple data records.

Referring to FIG. 7, the performance of an example data processing application 700 including a rollup module 706 can be audited. In the example data processing application 700, a stream of data records is received from a queue 704. The received stream of data records passes through an audit module 702a, which counts the quantity (A) of records in each record set.

The data records are rolled up by a 4:1 rollup module 706 that combines sets of four data records into a single output data record based on a join key. That is, for instance, each four records that share a common join key are rolled up into a single output data record. The rollup module is associated with metadata that specifies a mapping relationship between a quantity of data records received (B') and a quantity of data records output (B") by the rollup module. Thus, for the 4:1 rollup module 606, B'=4 and B"=1. Unlike the rollup module 606 described above, the rollup module 706 also includes a reject port 708 through which data records can be rejected during operation of the rollup module 706. The quantity of the rejected data records (C) is counted by an audit module 702b.

The rollup module 706 transfers the rolled up data records out for publication to a queue 708. An audit module 702c counts the quantity (B) of transferred out data records in each record set.

An example reconciliation rule for the data processing application 700 can be expressed as follows:

$$A-B \times C=0,$$

where B=-B'+B".

Determining how the actual quantity of data records (C) rejected by the rollup module relates to the quantity of output data records (B) can be complex. For instance, if a data record is rejected during an initialization process executed by the rollup module 706, the data record is rejected. However, an output data record may still be created that corresponds to the rejected data record, such as if a data record received later has the same join key. If a data record is rejected during a rollup process executed by the rollup module 706, the data record is rejected. However, an output data record may still be created that includes other data records having the same join key. If a data record is rejected during a finalization process executed by the rollup module 706, the single output data record corresponding to the four rolled up input data records is rejected.

In one example, this complexity can be addressed by mapping data records input to and output from the rollup module 706. For instance, a vector identifying each data record input to the rollup module 706 can be accumulated. The input data records corresponding to each output data record can be identified and compared to the input data records identified by the vector. Any data records that are identified by the vector but that do not appear in an output data record can be considered rejected.

In one example, each data record input to the rollup module 706 may have associated identifying metadata, such as a header. The identifying metadata for each data record input to the rollup component can be accumulated into a vector (e.g., $V=\{H_1, H_2, H_3, \ldots, H_n\}$). Each output data record may have associated identifying metadata, such as a header, that includes the identifying metadata for each input data that was rolled up into the output data record. That is, for instance, an output data record formed by rolling up input data records $H_1$, $H_2$, $H_3$, and $H_4$ may have an aggregated header $H_1H_2H_3H_4$. By comparing the vector of input data records to the aggregated header for each output data record, data records that were rejected or lost during execution of the rollup module 706 can be identified. The quantity of rejected or lost data records determined based on this comparison can be considered the quantity of data records (C) rejected by the rollup module 706. In some examples, the aggregated headers for the output data records are carried through any subsequent modules of the data processing application 700. In some examples, the aggregated headers are simplified after the auditing for the rollup module 706 has been completed. For instance, the aggregated header $H_1H_2H_3H_4$ may be simplified to $H_1$ after auditing for the rollup module.

The reconciliation performance of a data processing application across multiple record sets can provide insights into the operation of the data processing application, the existence of any problems with the operation of the data processing application, time-based variations in the operation of the data processing application, and other operating characteristics of the data processing application.

Figure 8:
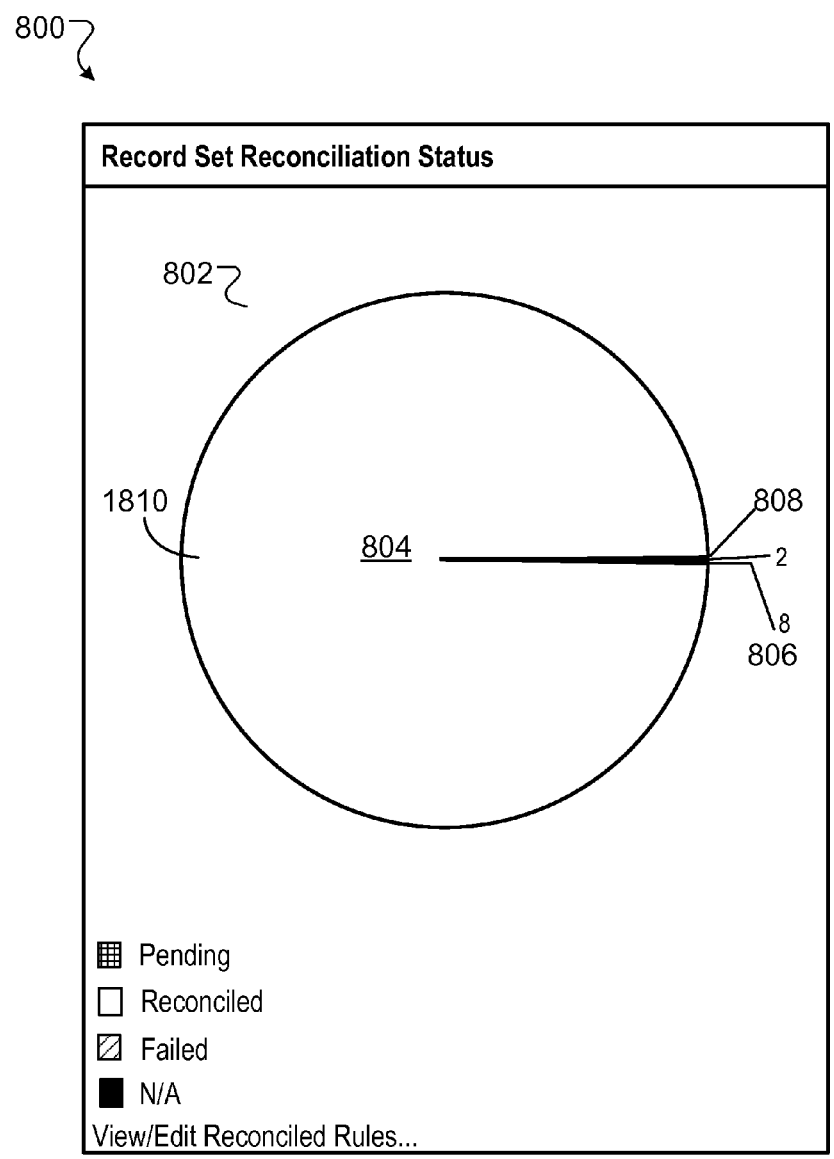
FIGS. 8 and 9 are example reconciliation reports.

Referring to FIG. 8, an example reconciliation report 800 includes a pie chart 802 of the reconciliation status for 1820 record sets processed by a particular data processing application. The vast majority of the record sets successfully reconciled, meaning that the reconciliation rule for the data processing application was satisfied after processing the record set (section 804). Eight record sets failed to reconcile (section 806) and two record sets were still pending reconciliation (section 808) at the time the pie chart 802 was displayed.

In some examples, the reconciliation report 800 may be presented on an interactive user interface. A user may select (e.g., by clicking on, tapping on, moving a mouse over, or otherwise selecting) a section of the pie chart 802 to receive more information about the record sets represented by the section. For instance, by selecting section 806, the user may be presented with a list or table of the quantities of data records counted by each audit module in the data processing application for the eight record sets that failed to reconcile. Based on this information, the user may be able to identify the point in the data processing application at which a problem occurred that caused the record set not to reconcile. The user interface may also enable the user to select the type of reconciliation displayed in the pie chart (e.g., end-to-end reconciliation or reconciliation of a particular module) and to control other aspects of the display of the reconciliation report 800.

Figure 9:
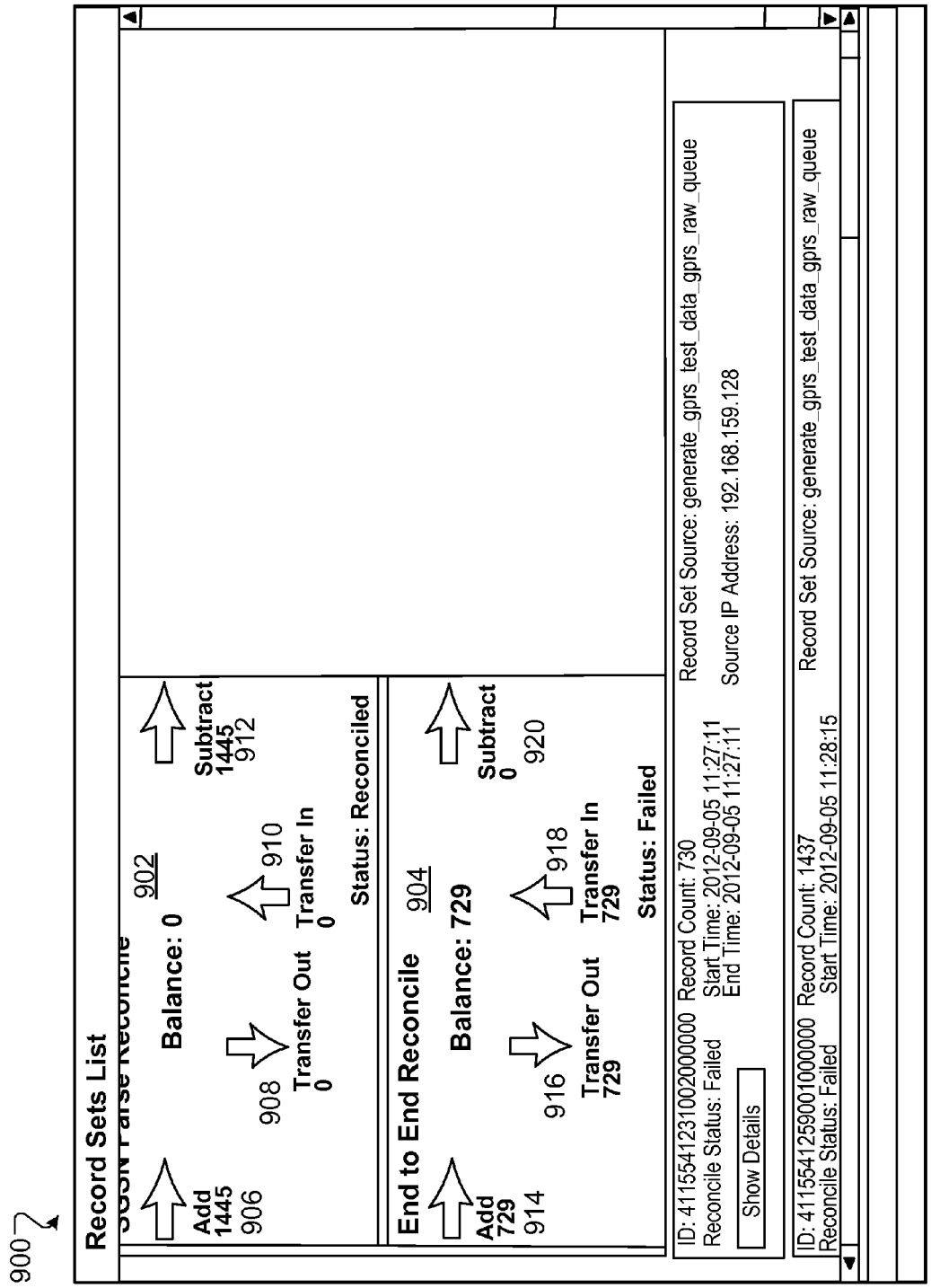

Referring to FIG. 9, another example reconciliation report 900 shows aggregate quantities for data records transferred into and out of a particular module of a data processing application (report 902) and for data records transferred into and out of the data processing application as a whole (report 904). The reconciliation report 902 for the particular module indicates that a record set of 1445 data records was received by the module (906), no records were transferred out of (908) or into (910) the module, and 1445 records were output by the module (912). That is, the quantity of records into the module matches the quantity of records out of the module, and the record set reconciled for the module. The reconciliation report 904 for the end-to-end reconciliation of the data processing application indicates that a record set of 729 data records was received (914), 729 data records were transferred out of the data processing application (916), 929 data records were transferred into the data processing application (918), and no records were output by the data processing application (920). Because the quantity of records into the data processing application does not match the quantity of records out of the data processing application, the record set failed to reconcile for the data processing application.

Figure 10:
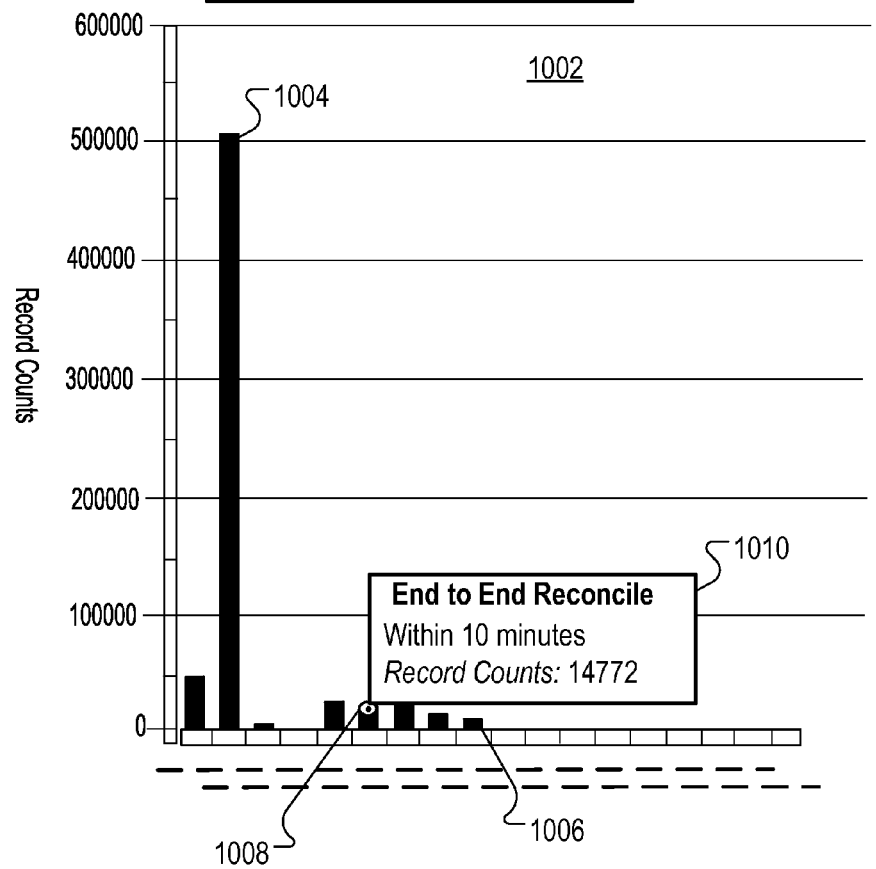
FIG. 10 is an example latency report.

Referring to FIG. 10, a latency report 1000 includes a bar graph 1002 showing the time to reconciliation for record sets processed by a data processing application. The majority of record sets reconciled within one minute (bar 1004). A small number of record sets took as long as two hours to reconcile (bar 1006). The latency report may be presented on an interactive user interface. A user may select (e.g., by clicking on, tapping on, moving a mouse over, or otherwise selecting) a bar to receive more information about the record sets represented by the bar. For instance, in the example shown, a user has selected a bar 1008 representing record sets that reconciled within ten minutes. A pop-up window 1010 displays the type of reconciliation (end-to-end reconciliation), the reconciliation time (10 minutes), and the quantity of data records (14772 records) for the selected bar 1008. The latency report 1000 also enables the user to select the type of reconciliation displayed in the bar graph (e.g., end-to-end reconciliation or reconciliation of a particular module); to display the data as record counts, percentage of total records, or other displays; and to control other aspects of the display of the latency report 1000.

Latency information can help a user to understand possible problems with a data processing application, a data source, or both. For instance, high latency may indicate that a queue to which a data processing application subscribes is not providing a continuous stream of data. A high latency may also indicate that a data source is not providing its data frequently enough. For example, a module of a data processing application may be unable to execute its computation until it receives data from a data source; if that data source is slow in providing data, that module will introduce latency into the data processing application.

Other reconciliation reports can also be displayed. For instance, graphs of data record volumes over time, such as volumes of input data records, rejected data records, or other data records, can be displayed. The data displayed graphically in the above examples can also be displayed in a table format or in another format.

Figure 11:
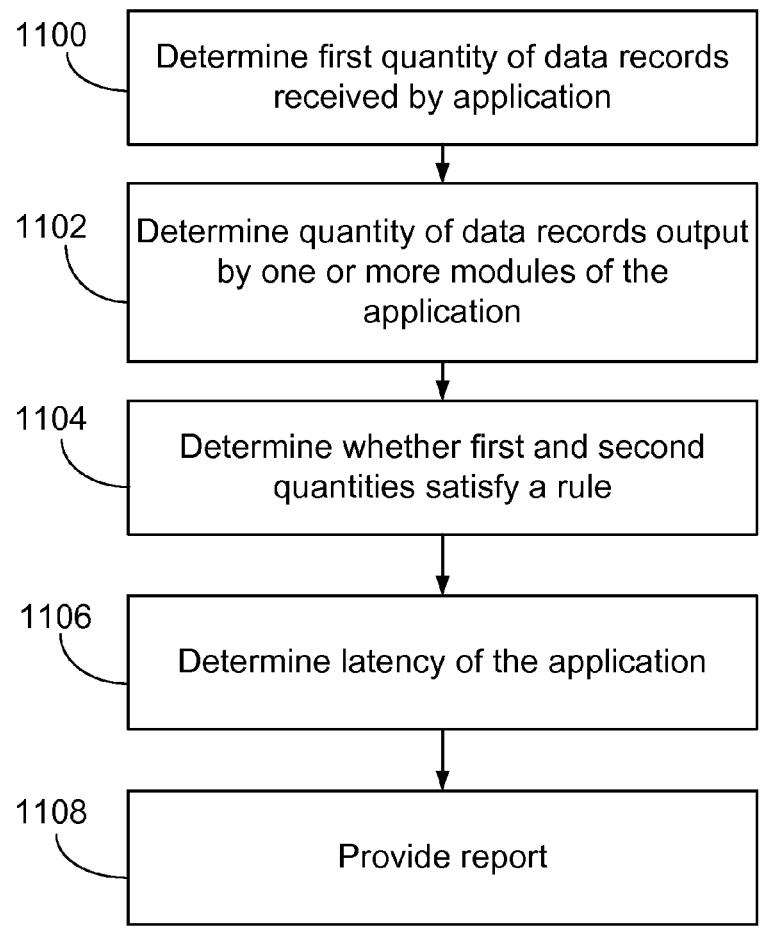
FIG. 11 is a flow chart.

Referring to FIG. 11, in a general approach to auditing of data processing applications, a first quantity of data records of a group of data records received by an application having a plurality of modules can be determined (1100). For instance, a record set is identified and a quantity of data records in the record set is determined. For one or more of the modules of the application, a respective second quantity of data records output by the module during processing of the group of data records can be determined (1102). For instance, a quantity of data records transferred out of a module or a quantity of data records rejected by a module, or both, is determined.

A determination can be made whether the first and second quantities of data records satisfy a rule, where the rule is indicative of a target relationship among a quantity of data records received by the application and a quantity of data records output by each component of the application (1104).

For instance, a rule may specify that the quantity of data records received by the application equals the quantity of data records that leave the application, e.g., by being transferred out or rejected. Another rule may specify that the quantity of data records received by the application equals the quantity of data records transferred out of the application. Another rule may take into account a module of the application that changes the quantity of data records, such as a rollup module or a join module.

In some examples, a latency of the application can also be determined (1106) based on a start time at which the application receives the data records in the group of data records and an end time at which the application finishes processing the data records in the group of data records.

In some examples, a report can be provided (1108) that indicates whether the rule was satisfied.

Referring to FIG. 12, in one example, the approach to record set reconciliation described herein can be applied to an analysis of the processing of mobile telephone records. In a mobile telephone system 1200, communications 1202, such as telephone calls, from mobile telephones 1204 or other communications devices are processed by one or more base stations 1206, and nodes on a general packet radio service (GPRS)) core network 1208. The GPRS network includes gateway GPRS support nodes (GGSN) 1210 and serving GPRS support nodes 1212 (SGSN), either or both of which may process the communications 1202. Data 1214, 1216 from the GGSN 1210 and the SGSN 1212, respectively, such as data about the time, duration, location, etc. of the communications 1202, are provided to a data analysis system 1218 hosted on a server 1220. The data analysis system 1218 processes the data 1214, 1216 and sends the processed data 1222 along with audit data 1223 to a downstream system 1224 for billing, analysis, or further processing.

The data analysis system 1218 includes an execution module 1217 (such as the execution module 112 described above with respect to FIG. 1) that executes one or more data processing applications to process the data 1214, 1216. For instance, the data processing applications may sort or filter the data 1214, 1216; correlate data 1214 from the SGSN 1212 and data 1216 from the GGSN 1214 that correspond to the same communication 1202; or perform other data processing on the data 1214, 1216. An audit module 1219 (such as the audit module 106 described above with respect to FIGS. 1 and 2) monitors the processing of the data 1214, 1216 by the modules of the data processing applications executed by the execution module 1217. The audit module 1219 also analyzes the results of the monitoring to determine information indicative of the performance of the data processing application. Audit data 1226 is also sent to the downstream system 1224 for analysis, e.g., for analysis of the performance of the data analysis system 1218.

For instance, the audit module 1219 may determine whether any data 1214, 1216 is lost or rejected in error during processing by the data analysis system 1218. If data is lost during processing, the communication represented by that lost data cannot be billed to a customer, resulting in lost revenue for the telephone company. System developers can use information from the audit module 106 about lost or corrupted data to make changes or improvements to the data processing applications in order to reduce data loss and thus increase revenue.

Figures 13A, 13B:
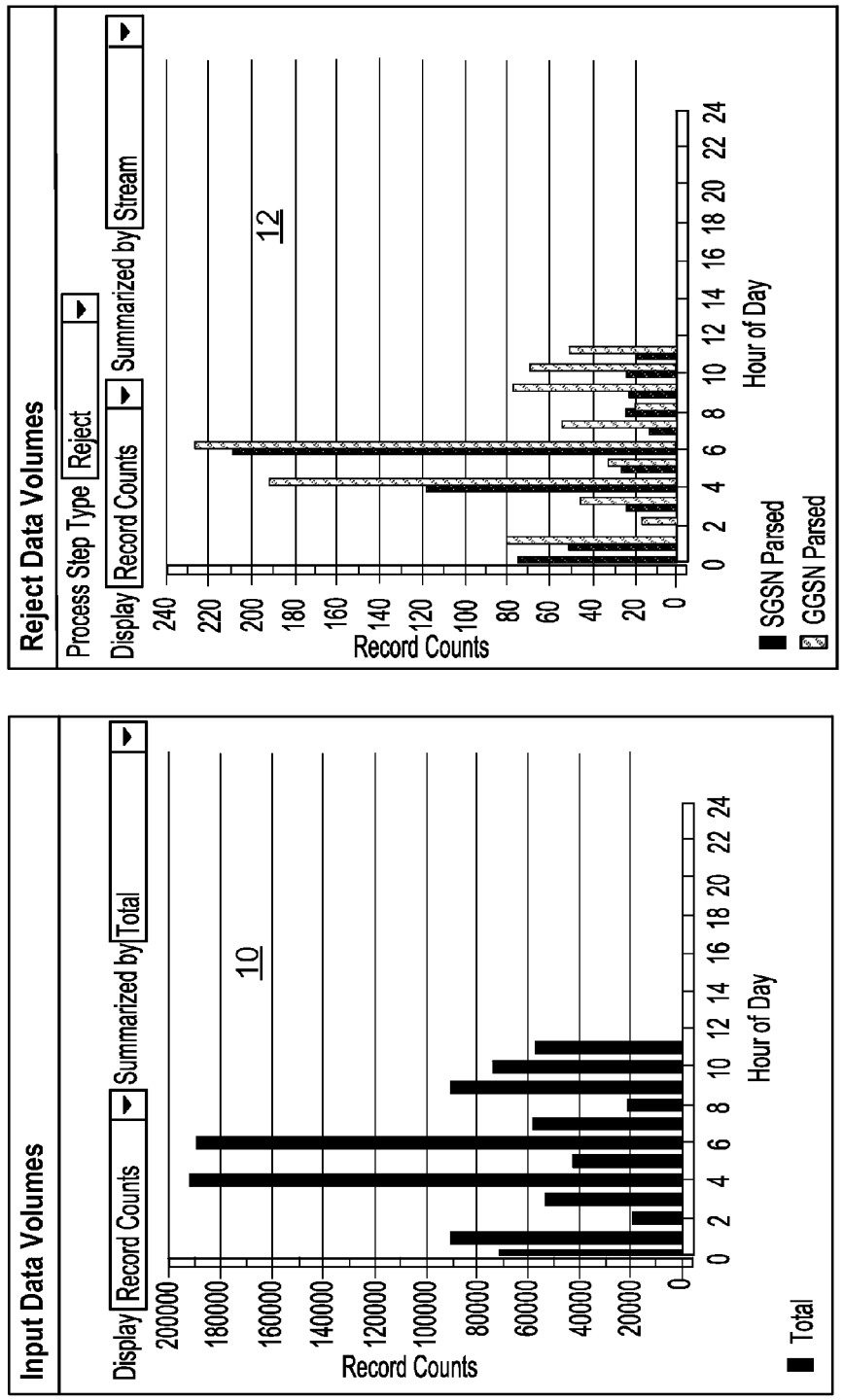
FIGS. 13A-13C are example data volume reports.
Figure 13C:
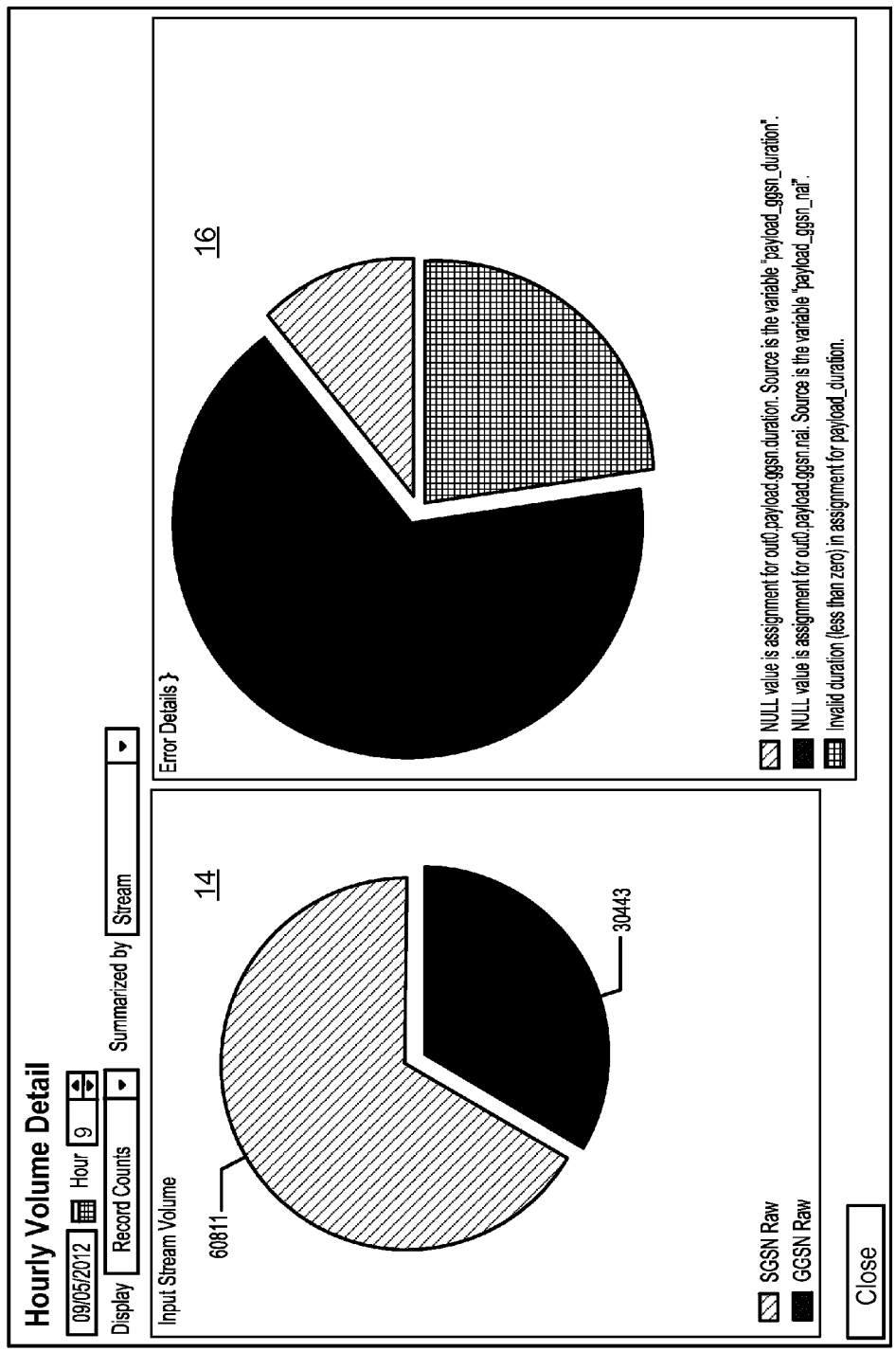

The audit module 1219 may also track the volume of data processed by the data analysis system 1218 (referred to herein as "data volume"). For instance, referring to FIG. 13A, in one example, the audit module 1219 may generate a report 10 showing the volume of data processed by the data analysis system 1218 each hour over the span of a day. Referring to FIG. 13B, in one example, the audit module 1219 may generate a report 12 showing the volume of data 1214 processed by the GGSN 1210 and the volume of data 1216 processed by the SGSN 1212 each hour over the span of a day. Referring to FIG. 13C, in one example, the audit module 1219 may generate a report 14 showing the volume of data 1214 processed by the GGSN 1210 and the volume of data 1216 processed by the SGSN 1212 in a particular hour (11:00, in the depicted example) of a particular day (Sep. 5, 2012, in the depicted example). A report 16 may also be generated that shows the nature of any errors that occurred during the particular time period.

Data volume over other time periods may also be tracked. For instance, data volume may be tracked by hour, day, month, or another time period, to show trends in data volume over a period of time. Data volume may also be tracked and sorted by one or more characteristics of the data, such as a geographical characteristic of the communication (e.g., the location of the origin of the communication, the location of the destination of the communication, or the location of any or all base stations 1206 or nodes 1210, 1212 involved in processing the communication).

Understanding trends in data volume over a period of time can help in planning changes in or upgrades to telephone network capacity infrastructure. In one example, the increase in the volume of data processed over the span of a year may be used by a company to inform a decision about building additional capacity infrastructure. In one example, the volume of data processed by geographical region may be used by a company to inform a decision about where to build additional capacity infrastructure.

The audit module 1219 may also determine the latency of the data processing applications, the latency of one or more particular modules in the data processing applications, or both. Latency information can be used, e.g., to identify problems in the data processing applications, problems with a source of data, or other problems.

In one example, referring back to FIG. 12, GGSN 1210 sends its data 1214 to the data analysis system 1218 every minute, while SGSN 1212 sends its data 1216 to the data analysis system 1218 every fifteen minutes. In this example, a correlation module that correlates GGSN data 1214 and SGSN data 1216 may have to wait for up to fifteen minutes for SGSN data 1216 to correlate with GGSN data 1214 it has already received. This wait introduces latency to the data processing application. A system developer can use an understanding of latency resulting from data flow, for instance, to make changes to the structure of the network 1208, the data processing applications, or both.

In another example, latency may be introduced by system backlog as a result of a system outage. For instance, if the data analysis system 1218 generally operates at 80% of its total capacity (i.e., the volume of data processed by the data analysis system 1218 is about 80% of the maximum volume of data that the data analysis system 1218 is capable of processing), a one day outage of the data analysis system 1218 can generate a backlog of data that takes five days to process. A company can use an understanding of backlog-related latency, for instance, to inform capacity planning decisions.

In some examples, other information can be monitored and analyzed instead of or in addition to data record quantity. For instance, byte counts through a data processing application can be tracked; this information can be used, e.g., to monitor system performance and to help inform future capacity planning decisions. Dollars of revenue associated with each data record or each record set can be tracked. Other information can also be tracked.

The approaches described herein to auditing data processing applications can be implemented using a computing system executing suitable software. For example, the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be provided on a tangible, non-transitory medium, such as a CD-ROM or other computer-readable medium (e.g., readable by a general or special purpose computing system or device), or delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method including:
   determining a first quantity of data records in a set of data records received by an application having a module;
   for the module of the application, determining a second quantity of data records provided as output by the module during processing of the set of data records;
   determining whether the first and second quantities of data records satisfy a rule indicative of a target relationship among a quantity of data records received by the application and a quantity of data records provided as output by the module of the application; and
   determining a latency associated with processing the set of data records by the application based on a time at which a particular data record was provided as output by the module of the application, the providing of the particular data record as output having caused the rule to be satisfied.

2. The method of claim 1, including providing a report indicative of whether the rule is satisfied.

3. The method of claim 1, wherein the module includes one or more output ports, and wherein the target relationship includes an indication that a quantity of records received by the module equals a quantity of records provided as output through the output ports of the module.

4. The method of claim 1, wherein the module provides as output an output quantity of records for each received input quantity of records, the input quantity different from the output quantity, and wherein the target relationship includes an indication of a ratio between the input quantity and the output quantity.

5. The method of claim 1, including specifying the rule.

6. The method of claim 1, including receiving a specification of the rule.

7. The method of claim 1, wherein determining a second quantity of data records output by the module of the application includes counting the data records provided as output from the module.

8. The method of claim 1, wherein determining a second quantity of data records provided as output by the module of the application includes:
   counting the data records provided as output from a first output port of the module; and
   calculating a number of data records provided as output from a second output port of the module based on the number of data records provided output from the first output port and a number of data records input into the module.

9. The method of claim 1, in which determining the latency associated with the application includes determining the latency based on a start time at which the application receives the set of data records and an end time at which the application finishes processing the set of data records.

10. The method of claim 9, wherein the application has finished processing the data records when the first quantity and the second quantities satisfy the rule.

11. The method of claim 1, including recording a time at which a particular one of the data records is processed by the module of the application.

12. The method of claim 11, including determining a latency of the module based on the recorded time.

13. The method of claim 1, including receiving the data records from a mobile telephone system.

14. The method of claim 1, wherein the data records include first data records processed by a first type of switch in a mobile telephone system and second data records processed by a second type of switch in the mobile telephone system.

15. A non-transitory computer readable medium storing instructions for causing a computing system to:
   determine a first quantity of data records in a set of data records received by an application having a module;
   for the module of the application, determine a second quantity of data records provided as output by the module during processing of the data records;
   determine whether the first and second quantities of data records satisfy a rule, the rule indicative of a target relationship among a quantity of data records received by the application and a quantity of data records provided as output by the module of the application; and determine a latency associated with processing the set of data records by the application based on a time at which a particular data record was provided as output by the module of the application, the providing of the particular data record as output having caused the rule to be satisfied.

16. A computing system including:

at least one processor coupled to a memory, the processor and memory configured to:

determine a first quantity of data records in a set of data records received by an application of having a module;

for the module of the application, determine a second quantity of data records provided as output by the module during processing of the set of data records;

determine whether the first and second quantities of data records satisfy a rule, the rule indicative of a target relationship among a quantity of data records received by the application and a quantity of data records provided as output by the module of the application; and determine a latency associated with processing the set of data records by the application based on a time at which a particular data record was provided as output by the module of the application, the providing of the particular data record as output having caused the second quantity to satisfy the rule.

17. A computer-implemented computing system including:

means for determining a first quantity of data records in a set of data records received by an application having a module;

means for determining, for the module of the application, a second quantity of data records provided as output by the module during processing of the set of data records;

means for determining whether the first and second quantities of data records satisfy a rule, the rule indicative of a target relationship among a quantity of data records received by the application and a quantity of data records provided as output by the module of the application; and means for determining a latency associated with processing the set of data records by the application based on a time at which a particular data record was provided as output by the module of the application, the providing of the particular data record as output having caused the second quantity to satisfy the rule.

18. The method of claim 1, including causing display, on a user interface, of an interactive graph including information indicative of one or more of (i) whether the rule was satisfied or (ii) the latency associated with processing the set of data records by the application.

19. The non-transitory computer readable medium of claim 15, wherein the module includes one or more output ports, and wherein the target relationship includes an indication that a quantity of records received by the module equals a quantity of records provided as output through the output ports of the module.

20. The non-transitory computer readable medium of claim 15, wherein the module provides as output an output quantity of records for each received input quantity of records, the input quantity different from the output quantity, and wherein the target relationship includes an indication of a ratio between the input quantity and the output quantity.

21. The non-transitory computer readable medium of claim 15, wherein determining a second quantity of data records provided as output by the module of the application includes:

counting the data records provided as output from a first output port of the module; and calculation a number of data records provided as output from a second output port of the module based on the number of data records provided as output from the first output port and a number of data records input into the module.

22. The non-transitory computer readable medium of claim 15, storing instructions for causing display, on a user interface, of an interactive graph including information indicative of one or more of (i) whether the rule was satisfied or (ii) the latency associated with processing the set of data records by the application.

23. The computing system of claim 16, wherein the module includes one or more output ports, and wherein the target relationship includes an indication that a quantity of records received by the module equals a quantity of records provided as output through the output ports of the module.

24. The computing system of claim 16, wherein the module provides as outputs an output quantity of records for each received input quantity of records, the input quantity different from the output quantity, and wherein the target relationship includes an indication of a ratio between the input quantity and the output quantity.

25. The computing system of claim 16, wherein determining a second quantity of data records provided as output by the module of the application includes:

counting the data records provided as output from a first output port of the module; and calculating a number of data records provided as output from a second output port of the module based on the number of data records provided as output from the first output port and a number of data records input into the module.

26. The computing system of claim 16, wherein the processor and memory are configured to cause display, on a user interface, of an interactive graph including information indicative of one or more of (i) whether the rule was satisfied or (ii) the latency associated with processing the set of data records by the application.

27. The computer-implemented computing system of claim 17, wherein the module includes one or more output ports, and wherein the target relationship includes an indication that a quantity of records received by the module equals a quantity of records provided as output through the output ports of the module.

28. The computer-implemented computing system of claim 17, wherein the module provides as outputs an output quantity of records for each received input quantity of records, the input quantity different from the output quantity, and wherein the target relationship includes an indication of a ratio between the input quantity and the output quantity.

29. The computer-implemented computing system of claim 17, wherein the means for determining a second quantity of data records output by the module of the application includes:

means for counting the data records provided as output from a first output port of the module; and means for calculating a number of data records provided as output from a second output port of the module based on the number of data records provided as output from the first output port and a number of data records input into the module.

30. The computer-implemented computing system of claim 17, including means for causing display, on a user interface, of an interactive graph including information indicative of one or more of (i) whether the rule was satisfied or (ii) the latency associated with processing the set of data records by the application.

31. A method including:
   determining a first quantity of data records received by a module of an application, each data record received by the module having a first identifier;
   determining a second quantity of data records provided as output by the module during processing of the data records, each data record provided as output by the module having a second identifier, the determining including determining the second quantity of data records based on a comparison between the first identifiers and the second identifiers; and
   determining whether the first and second quantities of data records satisfy a rule indicative of a target relationship among a quantity of data records received by the module of the application and a quantity of data records provided as output by the module of the application.

32. The method of claim 31, in which the rule specifies a relationship between the first identifiers and the second identifiers.

33. The method of claim 31, in which the rule specifies a ratio between the first quantity of data records and the second quantity of data records.

34. The method of claim 31, in which each second identifier includes multiple first identifiers.

* * * * *

UNITED STATES PATENT AND TRADEMARK OFFICE
CERTIFICATE OF CORRECTION

PATENT NO. : 9,143,624 B2
APPLICATION NO. : 13/837860
DATED : September 22, 2015
INVENTOR(S) : Larry Paul Rossi Page 1 of 1

It is certified that error appears in the above-identified patent and that said Letters Patent is hereby corrected as shown below:

<u>In the claims</u>

Col. 17, line 13, claim 16, delete "of having" and insert -- having --

Col. 18, line 3, claim 21, delete "calculation" and insert -- calculating --

Signed and Sealed this
Sixteenth Day of February, 2016

Michelle K. Lee
*Director of the United States Patent and Trademark Office*